United States Patent [19]

Gregor

[11] Patent Number: 4,966,706

[45] Date of Patent: Oct. 30, 1990

[54] PROCESS FOR TREATMENT OF CLARIFICATION SLUDGE

[75] Inventor: Carl H. Gregor, Grünwald, Fed. Rep. of Germany

[73] Assignee: Peroxid-Chemie GmbH, Hoellriegelskreuth, Fed. Rep. of Germany

[21] Appl. No.: 380,673

[22] Filed: Jul. 14, 1989

Related U.S. Application Data

[63] Continuation of Ser. No. 225,265, Jul. 28, 1988, abandoned.

[30] Foreign Application Priority Data

Aug. 5, 1987 [DE] Fed. Rep. of Germany ....... 3726020
May 18, 1988 [DE] Fed. Rep. of Germany ....... 3816989

[51] Int. Cl.$^5$ ................................. C02F 3/28
[52] U.S. Cl. ..................... 210/609; 210/613; 210/631; 210/754; 210/764; 210/916
[58] Field of Search ............... 210/754, 603, 605, 609, 210/613, 614, 630, 631, 756, 764, 916

[56] References Cited

U.S. PATENT DOCUMENTS 4,541,986 9/1985 Schwab et al. ................. 210/754 X

FOREIGN PATENT DOCUMENTS 2101798 of 0000 United Kingdom .

OTHER PUBLICATIONS

Chemical Abstracts, Band 102, Nr. 4, 1985, Siete 428, Nr. 31428z, "The Effectiveness of Chemical Disinfection of Fecal Bacteria in Sludge", Wastewater Treatment Plant Design, WPCF, 1977, seiten 515 and 519–521.
"Anaerobic Sludge Digestion".
Memento Technique de L'eau, seite 406, "Démarrage et conduite d'une installation de digestion".

*Primary Examiner*—Tom Wyse
*Attorney, Agent, or Firm*—Felfe & Lynch

[57] ABSTRACT

The present invention is in a process for the treatment of clarification sludge, wherein a sludge is treated with a per acid containing up to 3 carbon atoms and subsequently allowed to digest in a septic plant.

11 Claims, No Drawings

PROCESS FOR TREATMENT OF CLARIFICATION SLUDGE

This application is a continuation of application Ser. No. 225,265, filed July 28, 1988, now abandoned.

The present invention is concerned with a process for the treatment of clarification sludge.

In the case of the treatment of waste water, sludge results in several stages which, because of its content of nitrogen, mineral salts and phosphoric acid, is a valuable fertilizer. However, in order to be able to use the sludge obtained from clarification plants as fertilizer, the legal requirements with regard to clarification plants must be fulfilled. In particular, the sludge used for fertilizing must no longer be contaminated by pathogenic micro-organisms and parasites, for example worm eggs. Furthermore, the sludge must be so stabilised that it no longer contains compounds capable of putrefaction and thus no longer gives rise to offensive odors.

In order to fulfil these requirements, it is known to treat the sludge in a two-stage process. In this case, the sludge formed in a clarification plant is first treated with oxygen or air at a temperature of about 60° C. for a residence period of 1 day, which brings about a killing off of the micro-organisms and worm eggs. The sludge thus decontaminated is then passed to a septic plant and there digested.

A disadvantage of this known process is that relatively high investment costs are required for carrying it out. The step of aerobic sludge treatment can only be integrated into already existing clarification plants with great expense. Furthermore, even in the aerobic heating stage, organic substances are consumed so that the gas yield is smaller in comparison with a process in which an aerobic thermophilic treatment is not carried out. In addition, the aerobic heating stage requires an additional expenditure of time which, in turn, must be taken into account in the construction of the clarification plant. Since the sludge has a residence time of one day in the aerobic heating container, this container must be appropriately dimensioned in order to take up everything even in the case of the large quantities of sludge. This also requires a high investment.

Therefore, it is an object of the present invention to provide a process which produces a stabilised and decontaminated sludge, i.e. a sludge which is free of pathogenic micro-organisms and worm eggs, which process can be carried out without large investments in existing clarification plants and which does not result in a reduction of the gas yield.

Thus, according to the present invention, there is provided a process for the treatment of clarification sludge, wherein the sludge obtained in the treatment of waste water is treated with a per acid containing up to 3 carbon atoms and subsequently digested in a septic plant.

According to the process of the present invention, it is possible to produce a sludge which is free of pathogenic micro-organisms and of worm eggs and which is free of substances subject to putrefaction. The process can be carried out simply and quickly and does not require large investments even in the case of already existing clarification plants. Thus, a process is provided which, with increase of the gas yield and with smaller expenditure of time than was previously possible, provides a stable sludge which is in accord with the hygienic requirements.

All sludges obtained in the case of waste water treatments can be treated with the process according to the present invention. In particular, there can hereby be used primary and/or activated sludge. This sludge is treated with a per acid containing up to 3 carbon atoms, peracetic acid preferably being used and especially preferably equilibrium peracetic acid.

The treatment with per acid can take place in a sludge concentrator, during transport to a septic plant as well as even before the concentrator or the septic plant. The expenditure of time for this treatment is very small and is preferably in the range of from 10 minutes to 2 hours. Therefore, a special plant is not required for the treatment. In a preferred embodiment of the present invention, the per acid is added on the way to the septic plant. For this purpose, a mixing path is provided on the transport path to the septic plant which additionally contains a metering device with which the peracid can be added in measured amounts. The contact time of the sludge on this transport path is sufficient for the treatment with the per acid.

The amount of per acid is so measured that all pathogenic micro-organisms, as well as worm eggs, are killed off.

In order to achieve a sufficient killing off of the pathogenic micro-organisms and worm eggs, the per acid is preferably added in an amount of from 500 to 6000 mg./liter of sludge. A smaller amount no longer ensures a certain killing off, whereas higher concentrations of per acid do not bring about any further improvement and are, therefore, uneconomic. Especially preferably, the amount of per acid added is from 2000 to 4000 mg./liter of sludge. It is advantageous when a small excess of per acid is used. The residual amount of per acid which then reaches the septic plant then brings about the desired oxidation of hydrogen sulphide formed in the septic plant. Since the gas formed in the septic plant is used as a source of energy and is to be used for heating or in engines, it is, without per acid excess, very disadvantageous when it contains hydrogen sulphide which, for example, poisons catalysts and, even in very small concentrations, displays an unpleasant smell and has a corrosive action in the case of combustion.

Harmful or toxic products are not formed by the treatment with per acid. In the case of the oxidation with per acids, there are formed, depending upon the per acid used, carboxylic acids with 1 to 3 carbon atoms which also arise as intermediate products in the case of the putrefaction from the organic material and are then decomposed by methane bacterias to give methane gas, as well as carbon dioxide, water and oxygen, so that, by means of this treatment, no contamination takes place with harmful materials, such as metals or halides, as is, for example, the case with decontamination with chlorine.

The treatment step with per acid can be carried out at ambient temperature. Heating is not necessary so that, with the process according to the present invention, in comparison with known processes for decontamination, such as pasteurisation or aerobic thermophilic sludge treatment, energy is saved.

If necessary, after the treatment with the per acid, the pH of the sludge can be adjusted with a pH-regulating agent, for example calcium oxide or calcium hydroxide, to a value of from 7 to 9 in order that the sludge has an optimum pH value for the treatment in the septic plant.

Subsequent to the per acid treatment, the sludge is digested in a septic plant. Here, all substances capable of digestion are decomposed, in which case gas, preponderantly methane gas, is formed. This gas has a high calorific value and can be used to generate energy. Surprisingly, the gas yield in the case of the process according to the present invention is even higher than in the case of the previously known processes in which a pre-treatment step is not carried out.

By means of the pretreatment of the sludge by the process according to the present invention, the residence time in the septic plant is shortened. In the case of processes in which no such pretreatment of the sludge takes place, the residence time in the septic plant is from 20 to 25 days. According to the present invention, a residence time of from 8 to 20 days and especially preferably of from 10 to 15 days is sufficient in order to stabilise the sludge so that it no longer contains any putrefactable substances.

The so treated sludge can be used as fertilizer. It is so stable that practically no offensive odors result. Furthermore, recontamination with microorganisms is made difficult.

In the case of the process according to the present invention, the expenditure for apparatus is low since, for the treatment with per acid, only a metering and mixing device is necessary which can also be subsequently integrated into plant parts already present. Thus, for example, a mixing path for the mixing of the per acid with the sludge or a stirrer vessel can be provided. The usual residence times in the preconcentrator or in the septic plant exceed by far the contact times for the decontamination of the clarification sludge.

The process according to the present invention can be carried out simply and without great expense for apparatus and, from a hygienic point of view, provides a satisfactory sludge which can be used as a fertilizer.

The following Examples are given for the purpose of illustrating the present invention:

EXAMPLE 1

For the determination of the decontamination of clarification sludge, there was investigated the action of peracetic acid on the total micro-organism count (TMC), on Enterobacteriaceae (EBAS), faecal Streptococci (STREPT) and *Salmonella senftenberg* (SALM) in sludge containing decaying organisms and in raw sludge.

Carrying out of the experiment 4.5 liter amounts of sludge were mixed with 0.5 liter of a *Salmonella s.* suspension containing about $10^9$ micro-organisms/ml. Subsequently, with continuous stirring, various amounts of a 15% peracetic acid (PAA) were added thereto and, over the course of one hour, samples were removed every 10 minutes. A 24 hour sample served to determine whether only sublethally damaged micro-organisms were possibly present which recover in the course of a day.

The results obtained are set out in the following Tables 1(a) and 1(b):

TABLE 1a

| (Digested) Sludge containing decaying organisms with 3% PAA (15%)    4500 mg. PAA/liter | | | | | | |
|---|---|---|---|---|---|---|
| micro-organism | experiment No. | control (t = 0) | 10 min. | 30 min. | 60 min. | 24 hrs. |
| TMC | 1 | $3.5 \times 10^8$ | 0 | 0 | 0 | 0 |
|  | 2 | $8.5 \times 10^7$ | 0 | 0 | 0 | 0 |
| EBAS | 1 | $4.6 \times 10^7$ | 0 | 0 | 0 | 0 |
|  | 2 | $9.9 \times 10^7$ | 0 | 0 | 0 | 0 |
| STREPT. | 1 | $9.1 \times 10^3$ | 0 | 0 | 0 | 0 |
|  | 2 | $3.6 \times 10^4$ | 0 | 0 | 0 | 0 |
| SALM. | 1 | $2.5 \times 10^8$ | 0 | 0 | 0 | 0 |
|  | 2 | $2.5 \times 10^8$ | 0 | 0 | 0 | 0 |

TABLE 1b

| | Raw sludge with 2.5% PAA (15%)    3500 mg. PAA/liter | | | | | |
|---|---|---|---|---|---|---|
| micro-organism | experiment No. | control | 10 min. | 30 min. | 60 min. | 24 hrs. |
| TMC | 1 | $3.4 \times 10^8$ | $5.3 \times 10^2$ | $1.5 \times 10^2$ | $2.0 \times 10^2$ | $7.7 \times 10^2$ |
|  | 2 | $3.4 \times 10^8$ | $7.5 \times 10^2$ | $0.5 \times 10^2$ | 0 | $0.5 \times 10^2$ |
| EBAS | 1 | $1.5 \times 10^8$ | 0 | 0 | 0 | 0 |
|  | 2 | $2.8 \times 10^8$ | 0 | 0 | 0 | 0 |
| STREPT. | 1 | $8.8 \times 10^5$ | 0 | 0 | 0 | 0 |
|  | 2 | $7.4 \times 10^5$ | 0 | 0 | 0 | 0 |
| SALM. | 1 | $2.5 \times 10^8$ | 0 | 0 | 0 | 0 |
|  | 2 | $2.5 \times 10^8$ | 0 | 0 | 0 | 0 |

The above values show that a complete disinfection could be achieved in the case of sludge containing decaying organisms by the addition of 3% peracetic acid (15%) and, in the case of raw sludge, by the addition of 2.5% peracetic acid (15%).

EXAMPLE 2

Gas production in the putrefaction stage after pretreatment with peracetic acid

In two experiments, there were investigated the effects of the addition of peracetic acid to the putrefaction stage, especially on the gas production. For this purpose, 2 septic containers of 8 liter capacity, in the case of a residence time of 20 days, were treated with peracetic acid and untreated sludges digested.

In the case of the addition of only 1% peracetic acid (15%) before the digestion, the amount of gas increased on average by 13.4% and in the case of the addition of 2% peracetic acid (15%) on average by 28.8%. The proportion of carbon dioxide admittedly also increased from 28% (untreated) to 30% (treated with peracetic acid), which, however, only signifies an insignificant impairment of the gas quality which is far overcompensated for by the advantage of the substantially increased gas production. The increased gas production corresponds to a correspondingly increased energy recovery.

It will be understood that the specification and examples are illustrative but not limitative of the present invention and that other embodiments within the spirit and scope of the invention will suggest themselves to those skilled in the art.

What is claimed is:

1. A process for the treatment of clarification sludge, comprising: pretreating a raw sludge which contains pathogenic germs, parasites and germs for putrefaction with a per acid containing up to 3 carbon atoms in a concentration of 500 to 6000 mg of per acid per liter of sludge to form a pretreated sludge wherein the pathogenic germs and parasites are destroyed and the germs for digesting are not destroyed; and digesting the pretreated sludge.

2. The process of claim 1 wherein the digesting is in a digester.

3. The process of claim 2 wherein the treatment with the per acid is carried out in a pre-concentrator, in a path between the preconcentrator and digester or immediately before the digester.

4. The process of claim 2, wherein the digester in the digester is carried out over a period of from 8 to 20 days.

5. The process of claim 4 wherein the digestion in the digester is carried out for a period of from 10 to 15 days.

6. The process of claim 1 wherein peracetic acid is used as the per acid.

7. The process of claim 1 wherein the per acid is used in a concentration of from 2000 to 4000 mg. liter of sludge.

8. The process of claim 1 wherein the treatment of the sludge with per acid is carried out over a period of from 10 minutes to 2 hours.

9. The process of claim 1 wherein the pH of the sludge is adjusted to a value of from 7 to 9 before digesting.

10. The process of claim 9 wherein the pH of the sludge is adjusted with calcium oxide or calcium hydroxide.

11. The process of claim 1 wherein the sludge used is a primary and/or activated sludge.

* * * * *

UNITED STATES PATENT AND TRADEMARK OFFICE
CERTIFICATE OF CORRECTION

PATENT NO. : 4,966,706

DATED : October 30, 1990

INVENTOR(S) : Carl H. Gregor

It is certified that error appears in the above-identified patent and that said Letters Patent is hereby corrected as shown below:

Column 4, line 8, Table 1a, before "4500" insert -- $\hat{=}$ --.

Column 4, line 20, Table 1b, before "3500" insert -- $\hat{=}$ --.

Signed and Sealed this

Twenty-seventh Day of October, 1992

Attest:

DOUGLAS B. COMER

Attesting Officer

Acting Commissioner of Patents and Trademarks